United States Patent [19]

Benker et al.

[11] Patent Number: 4,565,442

[45] Date of Patent: Jan. 21, 1986

[54] METHOD OF AND APPARATUS FOR COPYING PHOTOGRAPHIC ORIGINALS

[75] Inventors: Gerhard Benker, Pullach; Helmut Treiber, Munich, both of Fed. Rep. of Germany

[73] Assignee: Agfa-Gevaert Aktiengesellschaft, Leverkusen, Fed. Rep. of Germany

[21] Appl. No.: 666,366

[22] Filed: Oct. 30, 1984

[30] Foreign Application Priority Data

Nov. 4, 1983 [DE] Fed. Rep. of Germany ....... 3339990

[51] Int. Cl.⁴ ............................................. G03B 27/74
[52] U.S. Cl. .......................................... 355/68; 355/77
[58] Field of Search ........................ 355/68, 77, 67, 69, 355/60

[56] References Cited

U.S. PATENT DOCUMENTS

| | | | |
|---|---|---|---|
| 4,152,068 | 5/1979 | Bickl et al. | 355/68 |
| 4,459,018 | 7/1984 | Stein et al. | 355/68 |
| 4,523,839 | 6/1985 | Payrhammer et al. | 355/68 |

FOREIGN PATENT DOCUMENTS 1914360  6/1977  Fed. Rep. of Germany.

*Primary Examiner*—Monroe H. Hayes

*Attorney, Agent, or Firm*—Peter K. Kontler

[57] ABSTRACT

A series of exposed and developed film strips having various lengths are spliced end-to-end for copying. The resulting band passes through a density measuring station in which the densities of the negatives are measured in the three primary colors and next through a magazine of variable capacity in which a portion of the band accumulates before entering a negative copying station including an exposure control device which regulates the exposures of the negatives on the measured basis of the density values. To insure that values derived from a selected strip are transferred to the exposure control unit when the strip enters the copying station, the splice immediately downstream of the selected strip is arrested in the density measuring station. The band continues to be drawn through the copying station so that the portion which has accumulated in the magazine is fully withdrawn. The portion of the band between the arrested splice and a splice sensor in the copying station has a known length. The arrested junction is now released and a length measuring device begins to measure the length of the portion travelling through the copying station. If the sensor detects a splice when the measured length equals the known length, this splice is the previously arrested splice.

30 Claims, 7 Drawing Figures

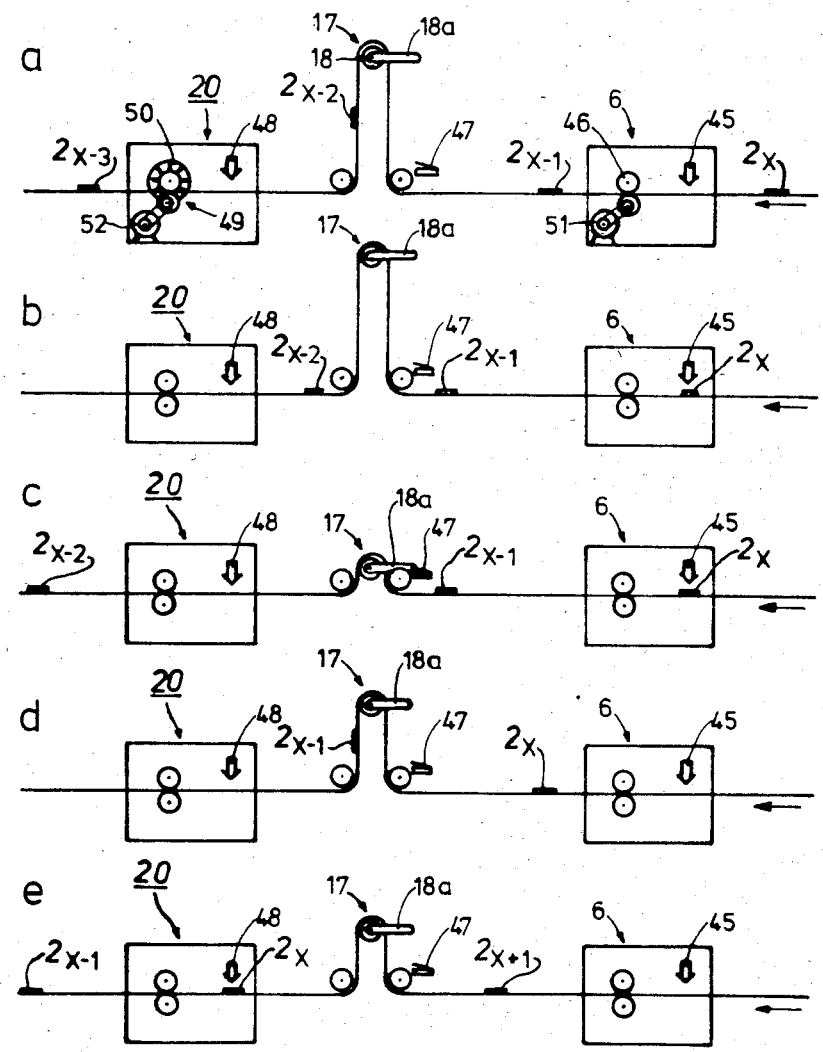

METHOD OF AND APPARATUS FOR COPYING PHOTOGRAPHIC ORIGINALS

BACKGROUND OF THE INVENTION

The invention relates generally to copying.

More particularly, the invention relates to the copying of photographic originals, e.g. negatives.

It is known to splice or otherwise join a series of individual, exposed and developed film strips end-to-end prior to copying the exposures or originals on the film strips. The resulting band of coherent film strips is convoluted into a roll which is then inserted in a copying apparatus designed to advance the originals from the roll to a copying station. The originals are rewound into a roll after copying.

The apparatus may have a measuring station upstream of the copying station for measuring the densities of the originals in the three primary colors. The measuring station is connected with an exposure control device which constitutes part of the copying station and controls the exposures of the originals as a function of the density values. A magazine or storage device having a variable capacity may be disposed between the measuring station and the copying station to permit accumulation of the originals. This may be desirable if there is to be a lapse between density measurement of the originals and copying of the latter.

The German patent No. 19 14 360 discloses a copying apparatus of this type. This apparatus is designed in such a manner that the density values for all of the originals of a film strip are measured and evaluated prior to copying any of the originals of the film strip. Since the density values for the entire film strip are then available before any copying is performed on the film strip, a more accurate determination may be made of the amounts of light required during exposure. A magazine is disposed between the measuring and copying stations of the apparatus of the German patent, and the maximum storage capacity of the magazine is precisely sufficient for the longest film strip to be processed during normal operation. The magazine is provided with a pair of displaceable rollers which enable the storage capacity of the magazine to be changed when the length of the film strips to be processed changes.

The magazine of the German patent is designed on the assumption that all of the film strips in a band of coherent strips have the same length. If the length of the film strips is changed, the storage capacity of the magazine must be adjusted.

In order to carry out a copying operation in a practical fashion, it is necessary to have the ability to combine film strips of different length into a single band. For instance, strips of 135 type film come with 36 exposures of 24×36 mm each; 24 exposures of 24×36 mm each; and 12 exposures of 24×36 mm each. The various strips may be mixed when they come in for processing, and strips with different numbers of exposures may have to be combined in a single band. Furthermore, in worse cases, it may be necessary to incorporate sections of torn film strips into a band. Such sections may be even shorter than the shortest intact film strip in the band.

When a band contains film strips having different lengths, more than one splice or junction may be located between the density measuring station and the copying station, i.e. more than one splice or junction may be located in the region of the magazine. In such an event, portions of several different film strips are disposed between the density measuring station and the copying station. This leads to synchronization problems. Thus, there exists the possibility that density values derived from one film strip become associated with another film strip and are used for exposure control of the latter rather than for exposure control of the film strip from which the density values were actually obtained.

OBJECTS AND SUMMARY OF THE INVENTION

It is an object of the invention to provide a copying method which does not require that all of the strips in a band of coherent strips have the same length.

Another object of the invention is to provide a copying method which reduces the likelihood that the density values derived from one strip of a band will become associated with another strip of the band even though the strips may have different lengths.

An additional object of the invention is to provide a copying method which enables density measurement and copying of any strip in a band to be synchronized in such a manner that the probability of the density values derived from a strip being employed for exposure control of the same strip is increased even though the strips may have different lengths.

A further object of the invention is to provide a copying apparatus which makes it unnecessary for all of the strips in a band of coherent strips to have the same length.

Still another object of the invention is to provide a copying apparatus which makes it less likely that the density values obtained from one strip of a band will become associated with another strip of the band even though the strips may have different lengths.

A concomitant object of the invention is to provide a copying apparatus which enables the density measuring station to be synchronized with the copying station in such a manner as to increase the probability that the density values derived from a strip will be employed for exposure control of the same strip even though the strips may have different lengths.

The preceding objects, as well as others which will become apparent as the description proceeds, are achieved by the invention.

One aspect of the invention resides in a method of copying originals, particularly photographic originals, e.g. exposed and developed negatives. In accordance with the invention, the method comprises the following steps:

A. Conveying a band having a succession of originals along a predetermined path. The band includes a plurality of coherent strips, preferably exposed and developed film strips, each of which has a leading and a trailing end and contains at least one of the originals. The trailing ends of the strips are connected to the leading ends of adjoining strips at respective junctions, e.g. splices, between the strips. The band may be in the form of a roll, and the conveying step then involves unwinding the band at the upstream end of the path and rewinding the band into a roll at the downstream end of the path.

B. Measuring the densities of the originals in a first zone of the path. The measuring step may include measurement of the density of each original in each of the three primary colors.

C. Copying the originals in a second zone of the path downstream of the first zone. The copying step comprises controlling the exposures of the originals as a function of the density values obtained during the measuring step. The exposure control may involve regulating the amount of light to which each original is exposed in each of the three primary colors, and this may be accomplished by adjusting the exposure time and/or the light intensity for each color.

D. Accumulating the originals in a third zone of the path intermediate the first and second zones.

E. Synchronizing or coordinating the measuring and copying steps so that the density values obtained from a selected strip are employed for exposure control of the originals constituting part of the selected strip. The synchronizing step includes i. Arresting one of the junctions at a first location of the path upstream of the third zone so that the portion of the band upstream of the first location is prevented from advancing. The arrested junction contains one of the ends of the selected strip, preferably the leading end of the latter. The first location at which the junction is arrested may be disposed in the first zone.

ii. Withdrawing originals from the third zone while arresting the junction. Withdrawal of the originals is performed until the portion of the band between the first location and a second location downstream of the third zone has a preselected length. The second location may be disposed in the second zone. It is preferred for originals to be withdrawn from the third zone until the portion of the band between the first and second locations has its minimum possible length, i.e. until the portion of the band remaining in the third zone corresponds to the minimum capacity of the third zone.

iii. Releasing the arrested junction when the portion of the band between the first and second locations reaches the preselected length.

iv. Measuring the length of the portion of the band which advances by the second location. The length measurement is initiated upon release of the arrested junction and continues at least until the measured length substantially equals the preselected length. Preferably, the speed of advance of the band past the first location is maintained at least equal to the speed of advance by the second location during the length measurement.

v. Sensing the band at the second location.

vi. Assigning the density values obtained from the selected strip for exposure control of the originals thereof upon detecting the previously arrested junction at the second location at such time as the length measured during the length measurement substantially equals the preselected length of the portion of the band between the first and second locations.

The synchronizing step may further include sensing the band at the first location of the path in order to detect arrival of the junction to be arrested at this location.

The synchronizing step may also comprise opening a monitoring aperture in dependence upon the length of the portion of the band travelling by the second location of the path. The monitoring aperture is opened upon initiation of the length measurement at a predetermined location which is spaced from the second location by a distance corresponding substantially to the preselected length of the portion of the band between the first and second locations. Sensing of the previously arrested junction at the second location is then performed within the confines of the monitoring aperture.

The density values obtained during the density measuring step may be temporarily stored before being assigned for exposure control of the respective strips.

Another aspect of the invention resides in an apparatus for copying originals, particularly photographic originals, e.g. exposed and developed negatives. An apparatus according to the invention comprises the following:

A. Conveying means for conveying a band having a succession of originals along a predetermined path. The band includes a plurality of coherent strips, preferably exposed and developed film strips, each of which has a leading and a trailing end and contains at least one of the originals. The trailing ends of the strips are connected to the leading ends of adjoining strips at respective junctions, e.g. splices, between the strips. The band may be in the form of a roll, and the conveying means then includes a take-off or supply reel at the upstream end of the path and a take-up reel at the downstream end of the path.

B. Density measuring means for measuring the densities of the originals in a first zone of the path. The density measuring means may be designed to measure the density of each original in each of the three primary colors.

C. Copying means for copying the originals in a second zone of the path downstream of the first zone. The copying means includes an exposure control device for controlling the exposures of the originals as a function of the density values obtained by the density measuring means. The exposure control device may be arranged to regulate the amount of light to which each original is exposed in each of the three primary colors. To this end, the exposure control unit may be designed to adjust the exposure time and/or the light intensity for each color.

D. Magazine means of variable capacity for accumulating the originals in a third zone of the path intermediate the first and second zones. Preferably, the magazine means is capable of accommodating at least one-half of the longest of the standard film strips. The conveying means includes a first conveying device upstream of the third zone, and a second driven conveying device downstream of the third zone. The first conveying device may be disposed in the first zone while the second conveying device may be disposed in the second zone.

E. Synchronizing or coordinating means for synchronizing the density measuring means and the copying means so that the density values obtained from a selected strip are employed for exposure control of the originals constituting part of the selected strip. The synchronizing means includes i. First sensing means upstream of the third zone for detecting the junctions between adjoining strips. The first sensing means, which may be situated in the first zone, is arranged to arrest the first conveying device in response to detection of a selected junction which includes one of the ends of the selected strip, preferably the leading end of the latter. The selected junction is arrested at a first location of the path upstream of the third zone upon arrest of the first conveying device, and the portion of the band upstream of the first location is then prevented from advancing. The first sensing means may be disposed at the first location. The second conveying device is arranged to witdraw originals from the magazine means during arrest of the first conveying device.

ii. Second sensing means at a second location of the path downstream of the third zone for detecting the junctions between adjoining strips. The second sensing means may be situated in the second zone.

iii. Length measuring means for measuring the length of the portion of the band travelling by the second location. The length measuring means may be disposed in the second zone and is preferably connected with the second conveying device.

iv. Switch means designed to activate the length measuring means and to release the first conveying device when the number of originals withdrawn from the magazine means during arrest of the first conveying device is such that the portion of the band between the first and second locations has a preselected length. The switch means may be mounted in the magazine means. It is preferred for the switch means to activate the length measuring means and to release the first conveying device when the portion of the band between the first and second locations has its minimum possible length, i.e. when the magazine means reaches its minimum capacity. The second sensing means and the length measuring means are designed to such a manner that the density values derived from the selected strip are assigned for exposure control of the originals thereof upon detection of the selected junction by the second sensing means at such time as the length measuring means has measured a length substantially equal to the preselected length of the portion of the band between the first and second locations.

In accordance with a preferred embodiment of the invention, a first means or device for sensing the junctions between adjoining strips is disposed in the density measuring station while a second means or device for sensing the junctions is situated in the copying station. A magazine of variable capacity is located between the density measuring station and the copying station, and the portion of the band between the two sensing devices is adjusted to a specific length by emptying the magazine to the point where it has its minimum capacity. The portion of the band between the sensing devices now has a well-defined preselected length so that a function detected at this time by the sensing device in the density measuring station may be virtually unambiguously recognized as the same junction upon detection by the sensing device in the copying station. This may be accomplished by measuring the length of the portion of the band travelling through the copying station. When the sensing device in the copying station detects a junction at such time as the measured length of the portion of the band travelling through the copying station equals the preselected length of the portion of the band between the sensing devices, it may be concluded that this junction is the same one as detected in the density measuring station at the beginning of the length measurement. Virtually positive identification of a junction is possible even if a plurality of junctions, and hence portions of several strips, are located between the density measuring station and the copying station. A situation in which more than one junction is situated between the density measuring station and the copying station may arise, for example, when the band contains several short strips. Assignment of the density values obtained from a strip for exposure control of the respective strip is also possible when the band is moved back-and-forth through the copying station or is manipulated in another manner, e.g. during the course of repair work.

The synchronizing or coordinating procedure may be repeated at intervals for a particular band. This enables routine spot checks to be made of whether the density values derived from the various strips are being employed for exposure control of the corresponding strips.

The novel features which are considered as characteristic of the invention are set forth in particular in the appended claims. The improved copying apparatus itself, however, both as to its construction and its mode of operation, together with additional features and advantages thereof, will be best understood from a perusal of the following detailed description of certain specific embodiments with reference to the accompanying drawings.

BRIEF DESCRIPTION OF THE DRAWINGS

FIGS. 3a-3e schematically illustrate a copying apparatus according to the invention at various stages of operation.

DESCRIPTION OF THE PREFERRED EMBODIMENTS

Figures 1, 2:
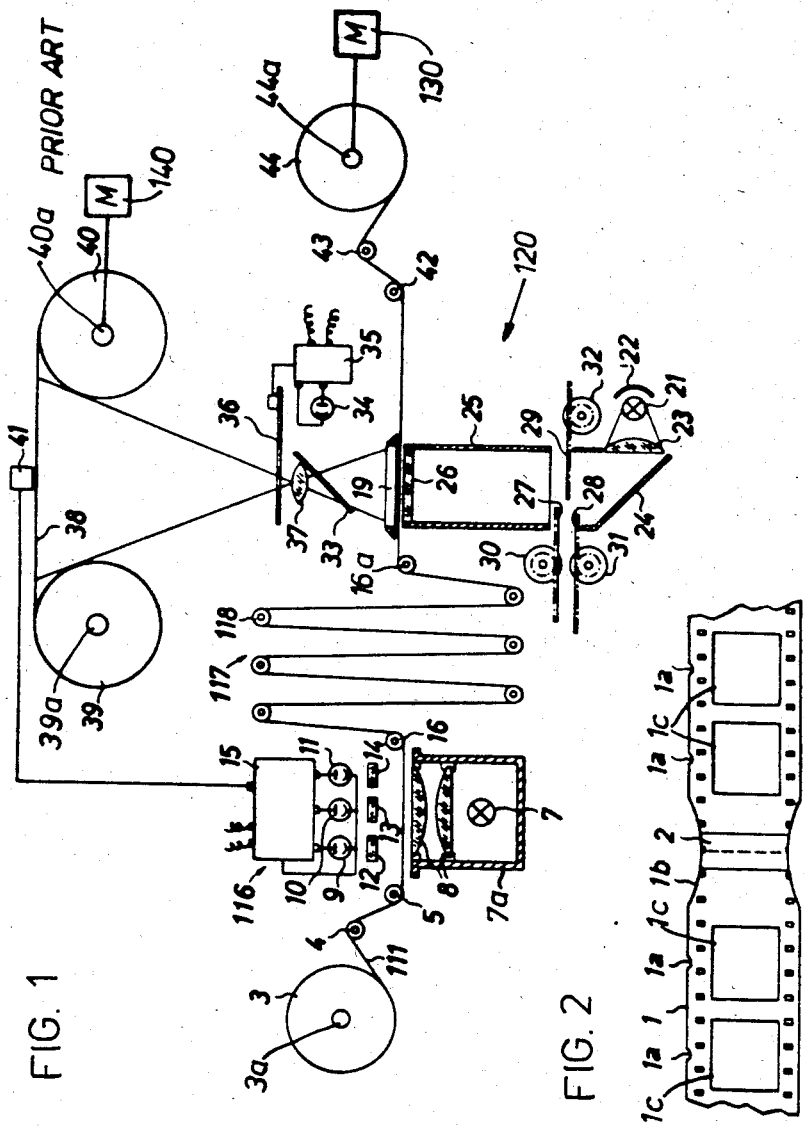
FIG. 1 schematically illustrates the arrangement of certain basic components of a prior art copying apparatus.
FIG. 2 illustrates adjoining portions of, as well as the junction between, a pair of exposed and developed film strips constituting part of a band of coherent film strips.

FIG. 1 illustrates a copying apparatus such as is disclosed in the German Pat. No. 19 14 360. This apparatus is designed to copy exposed and developed photographic originals such as film negatives. The originals to be copied are carried by a band 111 which is composed of a series of individual but coherent film strips each containing a set of originals or negatives. The band 111 is conveyed through the copying apparatus in a predetermined direction and along a predetermined path, and the trailing ends of the respective film strips, as considered in the direction of transport of the band 111, are connected to the leading ends of adjoining film strips, again as considered in the direction of transport of the band 111, by means of splices or other suitable junctions.

The band 111 is wound into a roll 3 which is rotatably supported by a take-off or supply reel 3a. In order to copy the originals carried by the band 111, the latter is paid out from the roll 3 and guided through the copying apparatus. The band 111 first passes by guide rollers 4 and 5, and into a measuring station 116 where the density of each original is measured in each of the three primary colors. Upon leaving the density measuring station 116, the band 111 is deflected by another guide roller 16 and travels to a magazine or storage unit 117. The magazine 117 includes a series of guide rollers 118 which are arranged so as to define a tortuous or winding path for the band 111. As a result, the distance of travel through the magazine 117 is relatively long thereby causing an accumulation of the originals in the magazine 117. The magazine 117 delays the arrival of any given film strip at a copying station 120 located downstream of the magazine 117. This permits the densities of all originals of the film strip to be measured before any of the originals of the film strip is copied. By measuring the densities of all originals of a film strip prior to copying any of the originals of the film strip, improved exposure control during copying may be obtained. After passing through the magazine 117, the band 111 is deflected into the copying station 120 via a guide roller 16a. The band 111 travels from the copying station 120 to an additional pair of guide rollers 42 and 43, and is then rewound into a roll 44 which is rotatably supported by a take-up reel 44a. The reel 44a is driven by a motor 130.

The reel 3a; the guide rollers 4, 5, 16, 16a, 42 and 43; the reel 44a; and the motor 130 together function as a conveying means for conveying the band 111 through the copying apparatus along a predetermined path.

The measuring station 116 includes a light source 7 which is accommodated in a housing 7a. Light from the source 7 travels through a condenser unit 8, and then passes through the originals carried by the band 111. The light subsequently impinges upon a set of three color filters 12,13,14 each of which transmits light in one of the three primary colors. The colored light issuing from the filter 12 enters a photoelectric cell 9; the colored light issuing from the filter 13 enters a photoelectric cell 10; and the colored light issuing from the filter 14 enters a photoelectric cell 11. The photoelectric cells 9,10,11 measure the respective light intensities which, in turn, are a function of the densities of the originals in the three primary colors. The density values obtained in this manner are evaluated in a processing device 15 and then transmitted to an exposure control device 41 constituting part of the copying station 120.

The exposure control device 41 regulates the exposures of the originals of a film strip as a function of the density values derived from the film strip in the density measuring station 116. The exposure of an original to light in each of the three primary colors is regulated by the exposure control device 41. To this end, the exposure control device 41 may regulate the exposure time and/or the light intensity in each of the three primary colors.

The copying station 120 further includes a light source 21, as well as a reflector 22 which is disposed behind the light source 21. The reflector 22 reflects light from the source 21 to a condenser 23. The light passing through the condenser 23 impinges upon a second reflector 24 which deflects the light so that it travels towards a mixing shaft 25. A set of three subtractive color filters 27,28,29 is disposed between the second reflector 24 and the mixing shaft 25. The color filters 27,28,29 are connected with respective servomotors 30,31,32 which are capable of shifting the color filters 27,28,29 so that they project into the path of the light travelling from the second reflector 24 towards the mixing shaft 25 to a greater or lesser degree. The servomotors 30,31,32 are controlled by the exposure control device 41. The color filters 27,28,29 have maximum densities, and each of the color filters 27,28,29 is capable of blocking the passage of light in one of the three primary colors. The color filters 27,28,29 function to adjust the composition of the light entering the mixing shaft 25 in dependence upon the densities obtained in the density measuring station 116.

A diffuser disc 26 is situated at the end of the mixing shaft 25 remote from the color filters 27,28,29. The light travelling along the mixing shaft 25 passes through the diffuser disc 26, and then through an original to be copied. During copying, each original is disposed between the mixing shaft 25 and a copying window or platen 19. The light issuing from the original to be copied travels through the platen 19, and to a partially light-transmissive reflector 33. A portion of the light impinging upon the reflector 33 is reflected to a light measuring device 34,35 which measures the amount of light emanating from the particular original to be copied. The light measuring device 34,35 is connected with and controls a shutter 36. The remainder of the light impinging upon the reflector 33 passes through the latter, and then through an objective 37 which causes an image of the original in the platen 19 to be formed on a web 38 of copying material. The web 38 is paid out from a roll 39 which is rotatably supported by a take-off or supply reel 39a. After passing through the copying station 120, the web 38 is rewound into a roll 40 which is rotatably supported by a take-up reel 40a. The take-up reel 40a is driven by a motor 140.

The apparatus of FIG. 1 operates satisfactorily when all of the film strips of the band 111 have the same length. If the film strips have different lengths, the apparatus of FIG. 1 cannot reliably insure that the density values derived from a given film strip in the density measuring station 116 will be transferred to the exposure control device 41 at the time that this film strip enters the copying station 120.

FIG. 2 shows adjacent portions of two film strips constituting part of a band 1 of coherent film strips having various lengths. As considered in the direction of advance of the band 1 during copying, the trailing ends of the film strips of the band 1 are connected to the leading ends of adjoining film strips via splices or other suitable junctions 2. Each of the film strips of the band 1 has one or more exposed and developed originals or negatives 1c. Although the originals 1c are illustrated as being square, this need not be the case. For example, it is possible for the originals 1c to have dimensions of 24×36 mm in which case the originals 1c are of the long type, or for the originals 1c to have dimensions of 18×24 mm in which case the originals 1c are of the half-size type. A notch 1a is formed next to each original 1c at one edge of the respective film strip. The notches 1a serve to locate the originals 1c in the correct position for copying adjacent to a platen such as the platen 19.

The junctions 2 between adjoining film strips are designed to be detectable by suitable sensors. For example, each of the junctions 2 may include a strip of material, e.g. an adhesive strip, which causes an infrared light barrier serving as a sensor to be activated when a junction 2 passes by the light barrier. It is further possible to form curved cutouts 1b in both edges of the band 1 adjacent to the respective junctions 2. The curved cutouts 1b at the two edges of the band 1 may be sensed by either a mechanical sensor or a sensor in the form of a light barrier.

If it is attempted to copy the originals 1c of the band 1 in the copying apparatus of FIG. 1, a synchronization or coordination problem arises. As mentioned previously, the apparatus of FIG. 1 operates satisfactorily when all film strips are of the same length. The magazine 117 may then be designed to accommodate a single film strip thereby making it a simple matter to transfer the density values obtained from a given film strip to the exposure control device 41 when this film strip enters the copying station 120. However, if the film strips have various lengths as do the film strips of the band 1, portions of several different film strips may be present in the magazine 117 at one time. This gives rise to the problem of synchronizing or coordinating the density measuring station 116 and the copying station 120 so that the density values belonging to a given film strip are transferred to the exposure control device 41 at the proper time, that is, at the time that such film strip enters the copying station 120.

According to the invention, the synchronization problem is overcome by making certain modifications in the copying apparatus of FIG. 1. The modified copying apparatus enables the density values for a given film strip to be transferred from the density measuring station 116 to the exposure control device 41 at the proper time with a high degree of reliability. The modifications made to the copying apparatus of FIG. 1 in accordance with the invention are described with reference to FIG. 3. The copying apparatus of the invention corresponds to that of FIG. 1 with the exception of the modifications to be outlined.

In the copying apparatus of FIG. 3, the density measuring station is identified by the reference numeral 6. The density measuring station 6 differs from the density measuring station 116 of FIG. 1 in that a sensor 45 is located in the density measuring station 6. The sensor 45 is designed to detect the junctions 2 between adjoining film strips of the band 1. Furthermore, a conveying device is situated in the density measuring station 6. The conveying device is here illustrated as a pair of rollers 46 driven by a motor 51. The conveying device 46,51 constitutes part of the conveying means for transporting the band 1 through the copying apparatus.

The copying apparatus of FIG. 3 has a magazine of variable capacity which is identified by the reference numeral 17. The magazine 17 includes a guide roller 18 which is movable up-and-down under the action of non-illustrated biasing means, e.g. one or more springs, in order to maintain tension in the portion of the band 1 between the density measuring station 6 and the copying station identified by the reference numeral 20. An arm 18a is mounted on the roller 18. The uppermost position of the roller 18 is shown in FIGS. 3a and 3b, and the capacity of the magazine 17 is at a maximum when the roller 18 is in its uppermost position. The lowermost position of the roller 18 is illustrated in FIG. 3c, and the capacity of the magazine 17 is at a minimum when the roller 18 is in its lowermost position. In the lowermost position of the roller 18, the arm 18a engages a microswitch 47 which, in addition to other functions, provides an indication that the magazine 17 is at its minimum capacity. The maximum capacity of the magazine 17 is preferably such that the latter can accommodate at least one-half of the longest of the standard film strips.

A second sensor 48 designed to detect the junctions 2 between adjoining film strips of the band 1 is disposed in the copying station 20. The copying station 20 further contains a second conveying device which, like the conveying device 46,51 in the density measuring station 6, constitutes part of the conveying means for transporting the band 1 through the copying apparatus. The conveying device in the copying station 20 is shown as including a pair of rollers 49 driven by a motor 52. A length measuring device for measuring the length of a portion of the band 1 transported through the copying station 20 is coupled to the second conveying device 49,52. By way of example, the length measuring device may comprise a disc 50 which is formed with a plurality of slots and is mounted for rotation with one of the rollers 49. The length measuring device then further comprises a non-illustrated light barrier arranged to detect the slots in the disc 50 as the latter rotates.

The band 1 may be advanced through the copying station 20 in steps and, under such circumstances, the length measuring device is preferably designed to generate a pulse for each step. The length measuring device here includes a pulse counter, and the length of the portion of the band 1 which has passed through the copying station 20 is obtained by converting the number of pulses counted by the pulse counter into a length.

FIG. 3 illustrates some of the junctions between adjoining film strips of the band 1. The junction which is farthest upstream is identified by the reference numeral $2_x$. The remaining junctions, as considered in downstream direction, are successively identified by the reference numerals $2_{x-1}$, $2_{x-2}$ and $2_{x-3}$.

The operation of the apparatus of FIG. 3 is as follows:

It is assumed that the situation is initially as illustrated in FIG. 3a. The band 1 is positioned with the junction $2_x$ immediately upstream of the density measuring station 6. The remaining junctions $2_{x-1}$, $2_{x-2}$, $2_{x-3}$ are located downstream of the density measuring station 6. The rollers 46,49 are driven as indicated by the respective arrows so as to advance the band 1 in a direction from the density measuring station 6 to the copying station 20. The movable roller 18 of the magazine 17 may, but need not, be in its uppermost position.

Starting from the situation depicted in FIG. 3a, it is desired to perform a synchronizing or coordinating procedure in order to assure that the density values derived from a given film strip are transferred from the density measuring station 6 to the exposure control device 41 at the time that the film strip enters the copying station 20. To this end, a synchronizing program to be run by a non-illustrated computer is retrieved. The synchronizing program includes a series of steps which are illustrated in FIGS. 3b–3e. In the present description, the density values obtained from the film strip immediately upstream of the junction $2_x$ are to be transferred to the exposure control device 41 upon entry of this film strip into the copying station 20.

In FIG. 3b, the junction $2_x$ has reached the sensor 45 which detects the junction $2_x$. The sensor 45 is connected with the motor 51 for the rollers 46 and, in response to detection of the junction $2_x$, shuts off the motor 51 so that the rollers 46 are arrested. The junction $2_x$ is thus arrested at the location of the sensor 45, and the portion of the band 1 upstream of the rollers 46 is prevented from advancing. The arrest of the rollers 46 is indicated by the elimination of the arrow which shows the direction of rotation of the rollers 46 in FIG. 3a.

If the synchronizing procedure is the initial synchronization for the band 1, or if the synchronizing procedure is the initial synchronization following a malfunction of the copying apparatus, it is advantageous to prevent copying of the originals 1c located downstream of the junction $2_x$. The portion of the band 1 downstream of the junction $2_x$ is then passed through the copying station 20 without initiating any copying operations.

The conveying device 49,52 continues to draw the band 1 through the copying station 20 after arrest of the rollers 46. This is indicated by the continuing presence of the arrow which shows the direction of rotation of the rollers 49 in FIG. 3a. The continued transport of the band 1 through the copying station 20 causes the portion of the band 1 which has accumulated in the magazine 17 to be withdrawn from the latter. Since the portion of the band 1 upstream of the rollers 46 is prevented from advancing, withdrawal of the band 1 from the magazine 17 results in downward movement of the movable roller 18 and an accompanying decrease in the capacity of the magazine 17.

As illustrated in FIG. 3c, the movable roller 18 eventually arrives at its lowermost position which corresponds to the minimum capacity of the magazine 17. In this condition, the portion of the band 1 between the sensors 45 and 48 has a well-defined length of known magnitude.

Upon arrival of the movable roller 18 at its lowermost position, the arm 18a engages and energizes the microswitch 47. Energization of the microswitch 47 causes the counter of the length measuring device including the slotted disc 50 to be set to zero. The counter now also begins to measure the length of the portion of the band 1 passing through the copying station 20.

Energization of the microswitch 47 further causes the conveying device 46,51 to be restarted so that the junction $2_x$ is released and the portion of the band 1 upstream of the rollers 46 is again able to advance. The conveying device 49,52 continues to operate as before. However, since the conveying device 46,51 is designed to operate at a higher speed than the conveying device 49,52, the band 1 once more begins to accumulate in the magazine 17.

FIG. 3d illustrates the situation shortly after reactivation of the conveying device 46,51. Inasmuch as the latter operates at a higher speed than the conveying device 49,52, the movable roller 18 begins to travel away from its lowermost position due to the reduction in the tension of the band 1 which accompanies the restarting of the conveying device 46,51. Movement of the roller 18 away from its lowermost position is accompanied by an increase in the capacity of the magazine 17.

Energization of the microswitch 47 additionally functions to activate a monitoring aperture in the counter of the length measuring device including the slotted disc 50. Activation of the monitoring aperture, in turn, causes deactivation of the sensor 48. The monitoring aperture has a size approximating that of a junction 2 and begins at a distance from the sensor 48 which corresponds to the length of the portion of the band 1 between the sensors 45 and 48 when the movable roller 18 is in its lowermost position.

As shown in FIG. 3d, the microswitch 47 is opened upon restarting of the conveying device 46,51 since the movable roller 18 travels away from its lowermost position. Moreover, the junction $2_x$ begins to move towards the copying station 20 and the sensor 48. Although the junction $2_{x-1}$ is located between the junction $2_x$ and the sensor 48, arrival of the junction $2_{x-1}$ at the sensor 48 does not result in the generation of a signal by the latter inasmuch as the sensor 48 has been deactivated.

In FIG. 3e, the junction $2_x$ has reached the sensor 48. When the junction $2_x$ arrives at the sensor 48, the monitoring aperture has just come into register with the sensor 48 and the latter has just been reactivated by the length measuring device. In other words, upon arrival of the junction $2_x$ at the sensor 48, the length measuring device has just completed measuring a length equal to the length of the portion of the band 1 between the sensors 45 and 48 when the movable roller 18 was in its lowermost position. The length measuring device then immediately reactivates the sensor 48 so that the latter generates a signal indicating detection of the junction $2_x$. Since the length measured by the length measuring device equals the distance, as measured along the band 1, between the junction $2_x$ and the sensor 48 at the time that the movable roller 18 was in its lowermost position, the generation of a signal by the sensor 48 upon reactivation thereof is a virtually certain indication that the junction responsible for the signal is the junction $2_x$ which was located adjacent to the sensor 45 at the beginning of the synchronizing procedure.

The signal generated by the sensor 48 when the junction $2_x$ reaches the same causes the density values for the film strip immediately upstream of the junction $2_x$ to be transferred to the exposure control device 41. The copying operation may now be restarted or continued with the assurance that the density values used for exposure control of the film strip just entering the copying station 20 are the density values derived from this film strip. This result is not affected if one or more additional junctions such as the junction $2_{x+1}$ shown in FIG. 3e pass by the sensor 45 before the junction $2_x$ reaches the sensor 48. The density values for the film strip located immediately upstream of each additional junction are stored and transmitted to the exposure control device 41 in order as the respective additional junction reaches the sensor 48.

In the event that no junction appears in the monitoring aperture while this is in register with the sensor 48, that is, if the sensor 48 fails to indicate the presence of a junction at such time as the length measuring device completes measurement of a length equal to the distance, as measured along the band 1, between the junction $2_x$ and the sensor 45 when the movable roller 18 was in its lowermost position, a warning signal may be generated. Moreover, transport of the band 1 through the copying apparatus may be automatically interrupted.

The synchronizing procedure according to the invention is primarily intended to provide an initial synchronization following the introduction of a fresh band 1 into the copying apparatus or following a recognizable interruption in operation, e.g. following repair work or other occurrences which necessitate removal of the band 1 from and reintroduction of the band 1 into the copying station 20. However, both the synchronizing procedure and the copying apparatus in accordance with the invention may, with minor modifications, be adapted for routine spot checks of the band 1 for synchronization. For instance, a synchronization check may be made at every tenth junction of the band 1. For routine spot checks, it is not necessary to interrupt the copying operation or to deactivate the sensor 48. Moreover, the monitoring aperture need function only to the extent of establishing whether or not a junction actually arrives at the sensor 48 on schedule. If the sensor 48 fails to detect a junction at the proper time, a signal may be generated in order to warn the operator that the apparatus must be checked. In addition, it is again possible to automatically interrupt transport of the band 1 through the copying apparatus.

The synchronizing or coordinating procedure of the invention does not depend upon the type of sensor used for detection of the junctions or upon the type of length measuring device employed. For example, the slotted disc 50 may be eliminated and the motor 52 designed as a stepping motor. The length measuring device may then simply be a step counter.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of copying originals, particularly photographic originals, comprising the steps of:
   (a) conveying a band having a succession of originals along a predetermined path, said band including a plurality of coherent strips each of which has a leading and a trailing end and contains at least one of said originals, and the trailing ends of said strips being connected to the leading ends of adjoining strips at respective junctions between said strips;
   (b) measuring the densities of said originals in a first zone of said path;
   (c) copying said originals in a second zone of said path downstream of said first zone, the copying step including controlling the exposures of said originals as a function of the density values obtained during the measuring step;
   (d) accumulating said originals in a third zone of said path intermediate said first and second zones; and
   (e) synchronizing the measuring and copying steps so that the density values obtained from a selected strip are employed for exposure control of the originals constituting part of said selected strip, the synchronizing step including
      (i) arresting one of said junctions at a first location of said path upstream of said third zone so that the portion of said band upstream of said first location is prevented from advancing, said one junction being situated at one of the ends of said selected strip,
      (ii) withdrawing originals from said third zone while arresting said one junction, said withdrawing being performed until the portion of said band between said first location and a second location downstream of said third zone has a preselected length,
      (iii) releasing said one junction when the portion of said band between said first and second locations reaches said preselected length,
      (iv) measuring the length of the portion of said band which advances by said second location, said length measurement being initiated upon release of said one junction and continuing at least until the measured length substantially equals said preselected length,
      (v) sensing said band at said second location, and
      (vi) assigning the density values obtained from said selected strip for exposure control of the originals thereof upon detecting said one junction at said second location at such time as said measured length substantially equals said preselected length.

2. The method of claim 1, wherein the synchronizing step comprises sensing said band at said first location.

3. The method of claim 1, wherein said first location is disposed in said first zone.

4. The method of claim 1, wherein said second location is disposed in said second zone.

5. The method of claim 1, wherein said preselected length is the minimum possible length for the portion of said band between said first and second locations.

6. The method of claim 1, wherein the synchronizing step comprises maintaining the speed of advance of said band by said first location at least equal to the speed of advance by said second location during said length measurement.

7. The method of claim 1, wherein the synchronizing step comprises opening a monitoring aperture in dependence upon the length of the portion of said band passing by said second location, said monitorong aperture being opened upon initiation of said length measurement at a predetermined location which is spaced from said second location by a distance corresponding substantially to said preselected length, and sensing of said one junction at said second location being performed within the confines of said monitoring aperture.

8. The method of claim 1, wherein said one junction is located at the leading end of said selected strip.

9. The method of claim 1, wherein the conveying step comprises paying out said band from a first roll, and convoluting said band into a second roll.

10. The method of claim 1, wherein said strips are film strips.

11. The method of claim 1, comprising the step of temporarily storing the density values obtained during the measuring step.

12. The method of claim 1, wherein the synchronizing step comprises preventing sensing of said band at said second location during an interval which begins upon initiation of said length measurement and terminates when said measured length substantially equals said preselected length, the copying step also being prevented during said interval.

13. The method of claim 1, comprising the step of interrupting the conveying step upon failure to detect said one junction at said second location at such time as said measured length substantially equals said preselected length.

14. The method of claim 1, comprising the step of generating a warning signal upon failure to detect said one junction at said second location at such time as said measured length substantially equals said preselected length.

15. The method of claim 1, wherein the synchronizing step is repeated for said band at intervals.

16. The method of claim 15, wherein the copying step and sensing of said band at said second location are performed throughout the repetitions of the synchronizing step.

17. The method of claim 15, comprising the step of generating a warning signal whenever a junction arrested at said first location fails to be detected at said second location at such time as said measured length substantially equals said preselected length.

18. An apparatus for copying originals, particularly photographic originals, comprising:
   (a) conveying means for conveying a band having a succession of originals along a predetermined path, the band including a plurality of coherent strips each of which has a leading and a trailing end and contains at least one of the originals, and the trailing ends of the strips being connected to the leading ends of adjoining strips at respective junctions between the strips;
   (b) density measuring means for measuring the densities of the originals in a first zone of said path;

(c) copying means for copying the originals in a second zone of said path downstream of said first zone, said copying means including an exposure control device for controlling the exposures of the originals as a function of the density values obtained by said density measuring means;

(d) magazine means of variable capacity for accumulating the originals in a third zone of said path intermediate said first and second zones, said conveying means including a first conveying device upstream of said third zone, and a second driven conveying device downstream of said third zone; and (e) synchronizing means for synchronizing said density measuring means and said copying means so that the density values obtained from a selected strip are employed for exposure control of the originals constituting part of the selected strip, said synchronizing means including (i) first sensing means upstream of said third zone for detecting the junctions between adjoining strips, said first sensing means being arranged to arrest said first conveying device in response to detection of a selected junction which is situated at one of the ends of the selected strip so that the selected junction is arrested at a first location of said path upstream of said third zone and the portion of the band upstream of said first location is prevented from advancing, said second conveying device being designed to withdraw originals from said magazine means during arrest of said first conveying device, (ii) second sensing means at a second location of said path downstream of said third zone for detecting the junctions between adjoining strips, (iii) length measuring means for measuring the length of the portion of the band travelling by said second location, and (iv) switch means designed to activate said length measuring means and to release said first conveying device when the number of originals withdrawn from said magazine means during arrest of said first conveying device is such that the portion of the band between said first and second locations has a preselected length, said second sensing means and said length measuring means being designed in such a manner that the density values derived from the selected strip are assigned for exposure control of the originals thereof upon detection of the selected junction by said second sensing means at such time as said length measuring means has measured a length substantially equal to the preselected length.

19. The apparatus of claim 18, wherein said magazine means is capable of accommodating at least one-half of the longest of the standard film strips.

20. The apparatus of claim 18, wherein said first conveying device is disposed in said first zone.

21. The apparatus of claim 18, wherein said second conveying device is disposed in said second zone.

22. The apparatus of claim 18, wherein said first sensing means is disposed at said first location of said path.

23. The apparatus of claim 18, wherein said first sensing means is disposed in said first zone.

24. The apparatus of claim 18, wherein said second sensing means is disposed in said second zone.

25. The apparatus of claim 18, wherein said conveying means comprises a take-off reel at an upstream end of said path, and a take-up reel at a downstream end of said path.

26. The apparatus of claim 18, wherein said length measuring means is connected with said second conveying device.

27. The apparatus of claim 18, wherein said length measuring means is disposed in said second zone.

28. The apparatus of claim 18, wherein said switch means is mounted in said magazine means.

29. The apparatus of claim 18, wherein the preselected length is the minimum possible length for the portion of the band between said first and second locations.

30. The apparatus of claim 18, wherein said copying means and said second sensing means are arranged to become inoperative in response to adjustment of the portion of the band between said first and second locations to the preselected length, said copying means and said second sensing means being designed to remain inoperative at least until such time as said length measuring means has measured a length substantially equal to the preselected length.

* * * * *